June 5, 1945.　　　　H. W. RECK　　　　2,377,809
SPRING SUSPENSION SYSTEM FOR RAILWAY CAR TRUCKS
Filed Nov. 2, 1943
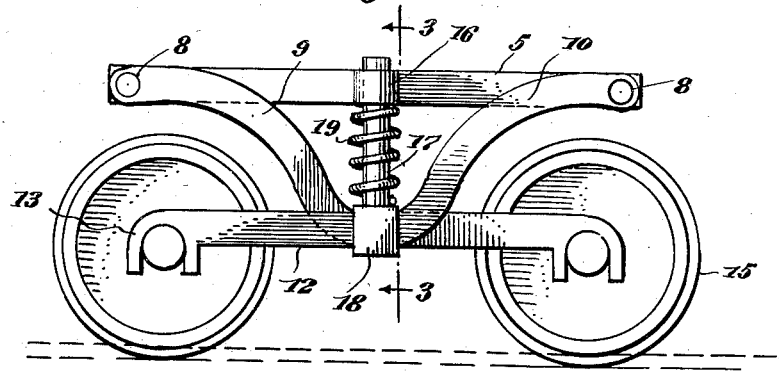
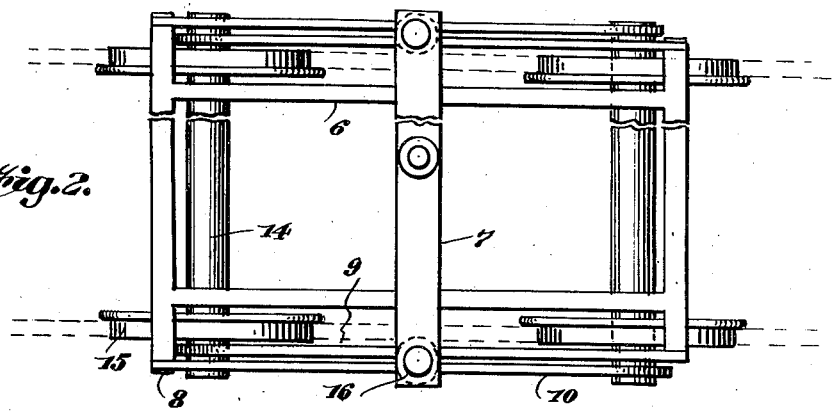
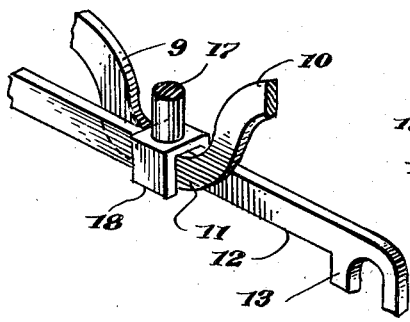
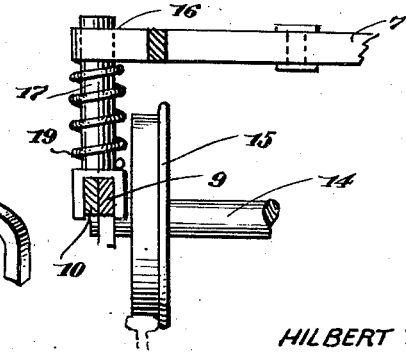
Inventor
HILBERT W. RECK
Attorney Patented June 5, 1945

2,377,809

UNITED STATES PATENT OFFICE 2,377,809

SPRING SUSPENSION SYSTEM FOR RAILWAY CAR TRUCKS

Hilbert W. Reck, Elgin, Ill.

Application November 2, 1943, Serial No. 508,663

3 Claims. (Cl. 105—182)

This invention relates to car trucks and more particularly to a spring suspension system especially designed for use in connection with railway car trucks.

The object of the invention is to provide a railway car truck, the construction of which is such as to insure smooth riding qualities of said truck and comfort to the passengers.

A further object of the invention is to provide a car truck including intersecting side bars having their upper ends pivotally mounted on the truck frame and their lower ends provided with terminal bearings for the axles of the truck wheels, yieldable means being interposed between the bolster of the car truck and the side bars at their points of intersection, whereby when one set of wheels passes over a low or sunken rail joint, the other set of wheels will yieldably sustain the load until the car has traveled over said low joint.

A further object is to provide the truck with depending spring supported pins having their upper ends journaled in the truck frame and their lower ends provided with depending yokes which span the pivoted side bars at the intersection thereof and permit independent pivotal movement of said side bars and, at the same time, exert a yieldable downward pressure on one of said side bars without affecting the other.

In the accompanying drawing forming a part of this application:

Figure 1 is a side elevation of a railway car truck provided with my improved spring suspension system.

Figure 2 is a top plan view.

Figure 3 is a detail vertical sectional view taken on the line 3—3 of Figure 1.

Figure 4 is a perspective view showing how the yoke of the spring supported pin spans the side bars at the intersection thereof.

The improved railway car truck forming the subject matter of the present invention comprises a main frame 5, preferably rectangular in shape, as shown, and provided with spaced longitudinal reinforcing bars 6 connected by a central bolster 7. Pivotally mounted at 8, on each side of the frame 5, are coacting side bars 9 and 10 having their intermediate portions curved downwardly and intersecting beneath the frame 5 at a point approximately midway the length of said frame, as indicated at 11, the ends of the bars 9 and 10 being extended longitudinally in a horizontal plane, as indicated at 12, and provided with terminal bearings 13 which receive the axles 14 of the wheels 15.

Depending from opposite sides of the frame 5 and journaled in suitable bearings 16 therein, are pins 17 having their lower ends provided with terminal substantially U-shaped yokes 18 which span the adjacent side bars 9 and 10 at their points of intersection and serve to hold said side bars together and, at the same time, permit independent pivotal movement thereof. Interposed between each yoke 18 and the adjacent bearing 16 is a coil spring 19, the purpose of which is to exert a downward yieldable pressure on the side bars so as to hold one set of the truck wheels to the track while the other set of wheels passes over a low joint or other inequality in the track, thereby to prevent jolting or vertical vibration of the truck with consequent discomfort to the passengers. As best seen in Figure 3 of the drawing, the side bars 9 and 10, and spring supported pins 17 are arranged on the outside of the wheels 15 and in spaced relation thereto, so as to permit proper functioning of the parts without interference.

When the truck is in action, should the forward pair of wheels 15 travel over a low rail joint or other depression in the track, the side bars 10 carrying the forward wheels will swing downwardly on their pivots 8, this movement of the side bars 10 being accomplished without corresponding downward movement of the other side bars 9, owing to the fact that both side bars are slidably mounted within the yoke 18 and may have swinging movement independent of each other. As the side bars 10 and the forward set of car wheels move downwardly in passing over a low joint, the spring 19 will exert a yieldable downward pressure on the side bars 9 and the rear wheels carried thereby so as to yieldably sustain the weight of the load during the passage of the truck over said joint, and when the truck has passed over the low joint, the side bars 10 carrying the front wheels 15 will automatically return to normal position, in which position the spring 19 will exert a downward yieldable pressure on both of said side bars.

When the truck is traveling in the opposite direction, a reverse movement of said parts will take place, as will be readily understood. The bearings 13 will, of course, be of standard construction, said bearings being indicated in their present form for the sake of clearness. It will furthermore be understood that the trucks may be made in different sizes and shapes and as many side bars and cushioning springs employed as is found desirable or necessary to accomplish the desired end.

From the foregoing description it is thought that the construction and operation of the device will be readily understood by those skilled in the art and further description thereof is accordingly deemed unnecessary.

Having thus described the invention, what is claimed is:

1. The combination with a railway car truck including a frame, bolster, and wheel supporting axles, of side bars having their upper portions pivotally mounted on the frame near the opposite ends thereof and thence curved downwardly in intersecting relation with their lower portions extended in a longitudinal plane and terminating in bearings engaging the adjacent axles, pins journaled in bearings on opposite sides of the frame and provided with terminal yokes spanning adjacent side bars at the intersection thereof, and springs encircling the pins and interposed between the frame and said yokes.

2. The combination with a railway car truck including a frame, a bolster, and wheel-supporting axles; of side bars pivotally mounted on the frame at opposite sides thereof and extending downwardly therefrom with their lower portions intersecting and extending longitudinally of the truck in opposite directions and provided with bearings rotatably mounting the adjacent axles, yokes depending from the frame and through which the side bars slidably pass, said side bars being movable vertically about their pivots independently of each other, and springs bearing against said yokes for exerting downward yielding pressure on at least one of said side bars at all times.

3. The combination with a railway car truck including a frame, bolster, and wheel supporting axles, of side bars pivotally mounted on the frame and having their lower portions intersecting at a point beneath the frame and thence extended longitudinally and provided with terminal bearings engaging the adjacent axles, pins depending from the frame, yokes carried by the pins and spanning adjacent side bars at their points of intersection and having their lower ends open to permit movement of either side bar therein, and springs surrounding the pins for exerting a yieldable downward pressure on one of said side bars when the other side bar is depressed.

HILBERT W. RECK.